(12) United States Patent
Akuta et al.

(10) Patent No.: US 9,041,964 B2
(45) Date of Patent: May 26, 2015

(54) IMAGE FORMING APPARATUS, COMPUTER-READABLE NON-TRANSITORY STORAGE MEDIUM WITH UPLOADING PROGRAM STORED THEREON, AND UPLOADING SYSTEM

(71) Applicant: KYOCERA Document Solutions Inc., Osaka (JP)

(72) Inventors: Hidehiko Akuta, Osaka (JP); Akihiro Umenaga, Osaka (JP); Sachiko Yoshimura, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/077,589

(22) Filed: Nov. 12, 2013

(65) Prior Publication Data
US 2014/0139887 A1 May 22, 2014

(30) Foreign Application Priority Data

Nov. 16, 2012 (JP) ................................. 2012-252765

(51) Int. Cl.
*G06F 3/12* (2006.01)
*H04N 1/00* (2006.01)
*H04N 1/44* (2006.01)

(52) U.S. Cl.
CPC ......... *H04N 1/00225* (2013.01); *H04N 1/4413* (2013.01); *H04N 1/4433* (2013.01); *H04N 2201/3226* (2013.01); *H04N 2201/3208* (2013.01)

(58) Field of Classification Search
None
See application file for complete search history.

(56) References Cited

U.S. PATENT DOCUMENTS

| | | | |
|---|---|---|---|
| 6,763,226 B1* | 7/2004 | McZeal, Jr. .................. | 455/90.2 |
| 8,229,811 B2* | 7/2012 | Hyakutake et al. ............. | 705/34 |
| 2003/0105809 A1* | 6/2003 | Yoshii et al. .................. | 709/203 |
| 2004/0024811 A1* | 2/2004 | Kitada et al. .................. | 709/203 |
| 2006/0026672 A1* | 2/2006 | Braun .............................. | 726/9 |
| 2007/0094499 A1* | 4/2007 | Dokuni ........................... | 713/168 |
| 2007/0206088 A1* | 9/2007 | Mizunashi et al. ........ | 348/14.01 |
| 2007/0226330 A1* | 9/2007 | Hitaka et al. .................. | 709/223 |
| 2007/0282995 A1* | 12/2007 | Mizuno et al. ................ | 709/223 |
| 2008/0244712 A1* | 10/2008 | Kitada et al. ..................... | 726/5 |
| 2009/0172795 A1* | 7/2009 | Ritari et al. ....................... | 726/7 |
| 2011/0153351 A1* | 6/2011 | Vesper et al. ..................... | 705/2 |
| 2012/0136793 A1* | 5/2012 | Valin et al. ...................... | 705/53 |
| 2012/0192260 A1* | 7/2012 | Kontsevich ........................ | 726/9 |
| 2013/0047232 A1* | 2/2013 | Tuchman et al. .................. | 726/7 |
| 2013/0117854 A1* | 5/2013 | Britton et al. .................. | 726/24 |
| 2013/0132854 A1* | 5/2013 | Raleigh et al. ................ | 715/738 |
| 2014/0075514 A1* | 3/2014 | Prasad et al. ....................... | 726/4 |

FOREIGN PATENT DOCUMENTS

JP    2007-026108 A    2/2007

* cited by examiner

*Primary Examiner* — Madelein Nguyen
(74) *Attorney, Agent, or Firm* — Knobbe, Martens, Olson & Bear LLP (57) ABSTRACT

An image forming apparatus includes a communication unit, a scanning unit, an issuing unit, a storage unit, an information receiving unit, an identification unit, an authentication unit, and a communication control unit. The image data number issuing unit issues a unique image data number for image data. A user inputs the image data number of the image data, cloud information, a login ID, and a password into an external terminal. The external terminal transmits the input content to the image forming apparatus. The login authentication unit performs authentication on a cloud identified by the target cloud identification unit using the transmitted login ID and password. When login is successful, the upload control unit transmits the image data of the image data number to the cloud.

8 Claims, 8 Drawing Sheets

_IMAGE FORMING APPARATUS, COMPUTER-READABLE NON-TRANSITORY STORAGE MEDIUM WITH UPLOADING PROGRAM STORED THEREON, AND UPLOADING SYSTEM_

INCORPORATION BY REFERENCE

This application claims priority to Japanese Patent Application No. 2012-252765 filed on Nov. 16, 2012, the entire contents of which are incorporated by reference herein.

BACKGROUND

The present disclosure relates to an image forming apparatus, a computer-readable non-transitory storage medium with a uploading program stored thereon, and an uploading system, and more particularly, to technology for uploading image data read by an image forming apparatus to a server which a cloud possesses.

Services using a server system connected to the Internet, called cloud services, are in general use. For example, technologies relating to services in which content data located at a server which a cloud possesses is transmitted from a mobile phone or a digital multifunction device to another arbitrary device are proposed. Meanwhile, when access to the server which the cloud possesses is provided, it is generally necessary to input a login identifier (ID) and a password for logging into the cloud, and technologies relating to such login are proposed.

SUMMARY

Technology that further improves the aforementioned technologies is proposed as one aspect of the present disclosure.

An image forming apparatus according to one aspect of the present disclosure includes a communication unit, a scanning unit, an issuing unit, a storage unit, an information receiving unit, an identification unit, an authentication unit, and a communication control unit.

The communication unit performs communication with an external terminal used by a user via a network.

The scanning unit scans a document image to obtain image data.

The issuing unit issues an image data number identifying the image data.

The storage unit maps and stores the image data and the image data number.

The information receiving unit receives the image data number, upload destination identification information indicating an upload destination of the image data, and login information for logging into the upload destination from the external terminal via the communication unit.

The identification unit identifies the upload destination based on the upload destination identification information received by the information receiving unit.

The authentication unit performs an authenticating process required to perform an authentication of whether or not to give access to the upload destination indentified by the identification unit based on the login information received by the information receiving unit.

The communication control unit reads out the image data corresponding to the image data number received by the information receiving unit from the image data stored by the storage unit when the access to the upload destination is permitted in the authenticating process by the authentication unit, and transmits the corresponding image data to the upload destination.

DETAILED DESCRIPTION

First Embodiment

Figure 1:
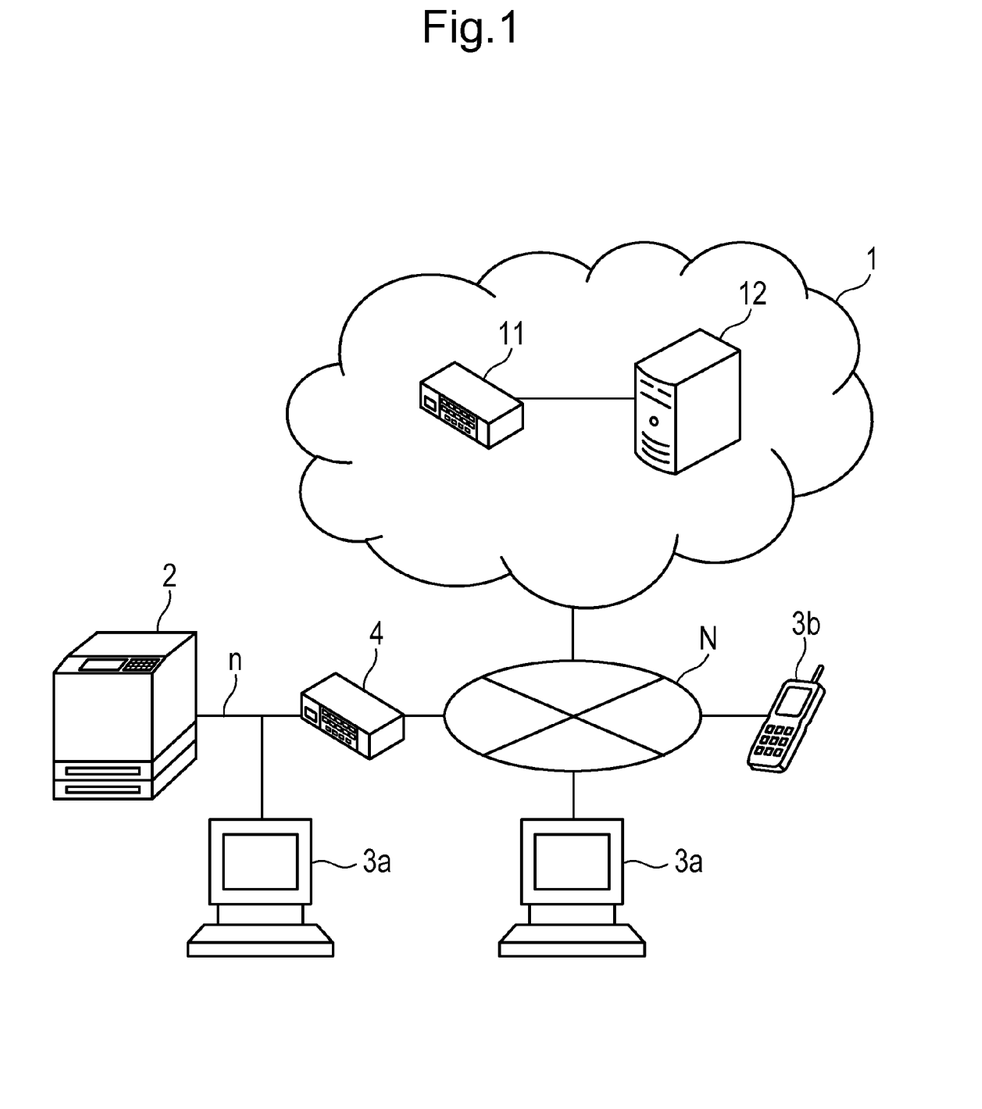
FIG. 1 is a diagram for describing an uploading system according to a first embodiment of the present disclosure.

Hereinafter, an image forming apparatus, a computer-readable non-transitory storage medium with a uploading program stored thereon, and an uploading system according to a first embodiment of the present disclosure will be described with reference to the drawings. FIG. 1 is a diagram for describing an uploading system according to a first embodiment. The uploading system according to the first embodiment includes, for instance, a cloud 1, an image forming apparatus 2, and at least one of a personal computer 3a and a mobile phone 3b.

The cloud 1 has a router 11 and a server 12. The router 11 is an electronic device for interconnecting the server 12 and the Internet N. The server 12 is a control device that provides predetermined service to electronic devices connected to the Internet N.

The router 4 is an electronic device for interconnecting the Internet N and a network n to which the image forming apparatus 2 and the personal computer 3a are connected. The image forming apparatus 2 is a multifunction device having a plurality of functions such as a scanner function, a copy function, a printer function, and a facsimile function. In the present embodiment, the image forming apparatus may at least have the scanner function, or the scanner and printer functions only.

The mobile phone 3b is an example of an external terminal that is connected to the Internet N and is capable of performing communication. A user can access the cloud 1 or the image forming apparatus 2 using the personal computer 3a or the mobile phone 3b. The external personal computer 3a is connected to the Internet N. Hereinafter, the personal computer 3a and the mobile phone 3b are collectively referred to as an "external terminal 3." The external terminal 3 is preferably a terminal which a user personally uses.

Figure 2:
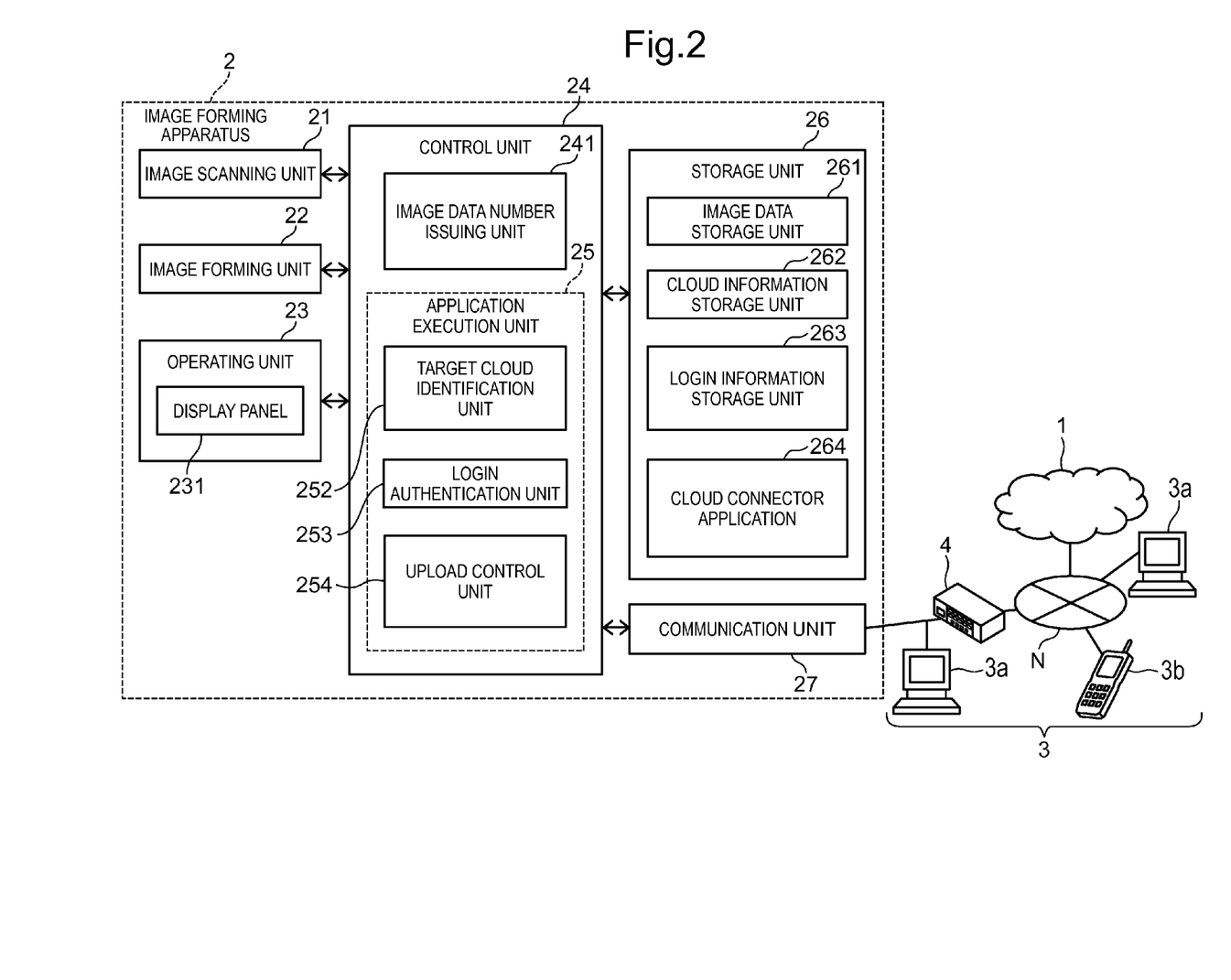
FIG. 2 is a block diagram showing an electrical constitution of an image forming apparatus according to the first embodiment of the present disclosure.

FIG. 2 is a block diagram showing an electrical constitution of the image forming apparatus 2 in the present embodiment. The image forming apparatus 2 includes an image scanning unit (scanning unit) 21, an image forming unit (printing unit) 22, an operating unit 23, a control unit 24, a storage unit 26, and a communication unit (reception unit) 27.

The image scanning unit 21 scans an image of a document to generate image data. The generated image data is mapped to an image data number that is image data-specific identification information issued by an image data number issuing unit 241 to be described below, and is stored in an image data storage unit 261 of the storage unit 26.

The image forming unit 22 forms an image based on printing data on paper as a recording medium. The operating unit 23 includes either operation keys or a display panel (display unit) 231 such as a liquid crystal display (LCD) having a touch panel function, either of which receives an instruction from an operator with respect to various operations and processes which the image forming apparatus 2 can carry out.

The storage unit 26 stores a cloud connector application 264. The storage unit 26 includes the image data storage unit 261, a cloud information storage unit 262, and a login information storage unit 263. The image data storage unit 261 stores the image data which the image scanning unit 21 scans and the image data number which the image data number issuing unit 241 issues in a mapped state.

The cloud information storage unit 262 stores information of the cloud which the image forming apparatus 2 can use, i.e. information (uniform resource locator (URL), etc.) indicating an access destination of the cloud. The login information storage unit 263 stores login information and a password for logging into the cloud. The cloud information stored in the cloud information storage unit 262 and the login information stored in the login information storage unit 263 are previously registered by a network manager that manages the connection of the image forming apparatus 2 and the Internet N.

The cloud connector application 264 is an application activated when the image forming apparatus 2 uses the cloud 1, and will be described below in detail.

The communication unit 27 is an interface circuit that performs communication with each electronic device such as a router 4 via a local area network (LAN) or a wide area network (WAN) to which the image forming apparatus 2 is connected.

The control unit (display control unit) 24 is made up of a central processing unit (CPU), reads and processes the program such as the cloud connector application 264 stored in the storage unit 26, and performs output of an instruction signal and transmission of data to each functional unit, thereby collectively controlling the image forming apparatus 1. The control unit 24 has an image data number issuing unit (issuing unit) 241 and an application execution unit 25.

The image data number issuing unit 241 issues a unique image data number for the image data which the image scanning unit 21 reads out of a document. Then, the control unit 24 maps the image data and the image data number and stores them in the image data storage unit 261.

The application execution unit 25 reads and processes the cloud connector application 264 out of the storage unit 26, and includes a target cloud identification unit (identification unit) 252, a login authentication unit (authentication unit) 253, and an upload control unit (communication control unit) 254.

The target cloud identification unit 252 identifies a cloud (target cloud) indicated by the cloud information (upload destination identification information) transmitted from the external terminal 3 based on content stored in the cloud information storage unit 262.

The login authentication unit 253 performs an authenticating process on the target cloud based on the login ID and the password that are transmitted from the external terminal 3. The authenticating process is a series of processes until the login authentication unit 253 provides access to the cloud indicated by the cloud information, transmits the login ID and the password to the corresponding cloud, and obtains login permission from the corresponding cloud. When the login authentication unit 253 obtains the login permission to the target cloud, the upload control unit 254 uploads the image data designated by a user to the target cloud.

When the user uploads the image data stored in the image data storage unit 261 to the cloud, the user inputs the image data number of the image data, the cloud information of an upload destination (upload destination identification information), and the login information having the login ID and the password for logging into the cloud (hereinafter, these pieces of information are referred to collectively as "upload information") into the external terminal 3. The external terminal 3 transmits the upload information to the image forming apparatus 2 via the Internet N.

Conventionally, the login ID and the password for the cloud are directly input from the operating unit 23 of the image forming apparatus 2. However, since the users of the image forming apparatus 2 are generally an unspecified number of persons, when the login ID and the password are exposed to another person in the course of the input or when the user is separated from the image forming apparatus in the course of the input, the login ID and the password are known to the other person, and it is impossible to sufficiently secure security.

Therefore, in this embodiment, when the user uploads the image data to the cloud, the login ID and the password are input/transmitted from the personal computer 3a or the mobile phone 3b, which the user uses individually, to the cloud. Thereby, it is not necessary to directly input the login ID and the password into the image forming apparatus 2, and leakage of the login ID and the password is prevented.

Figure 3:
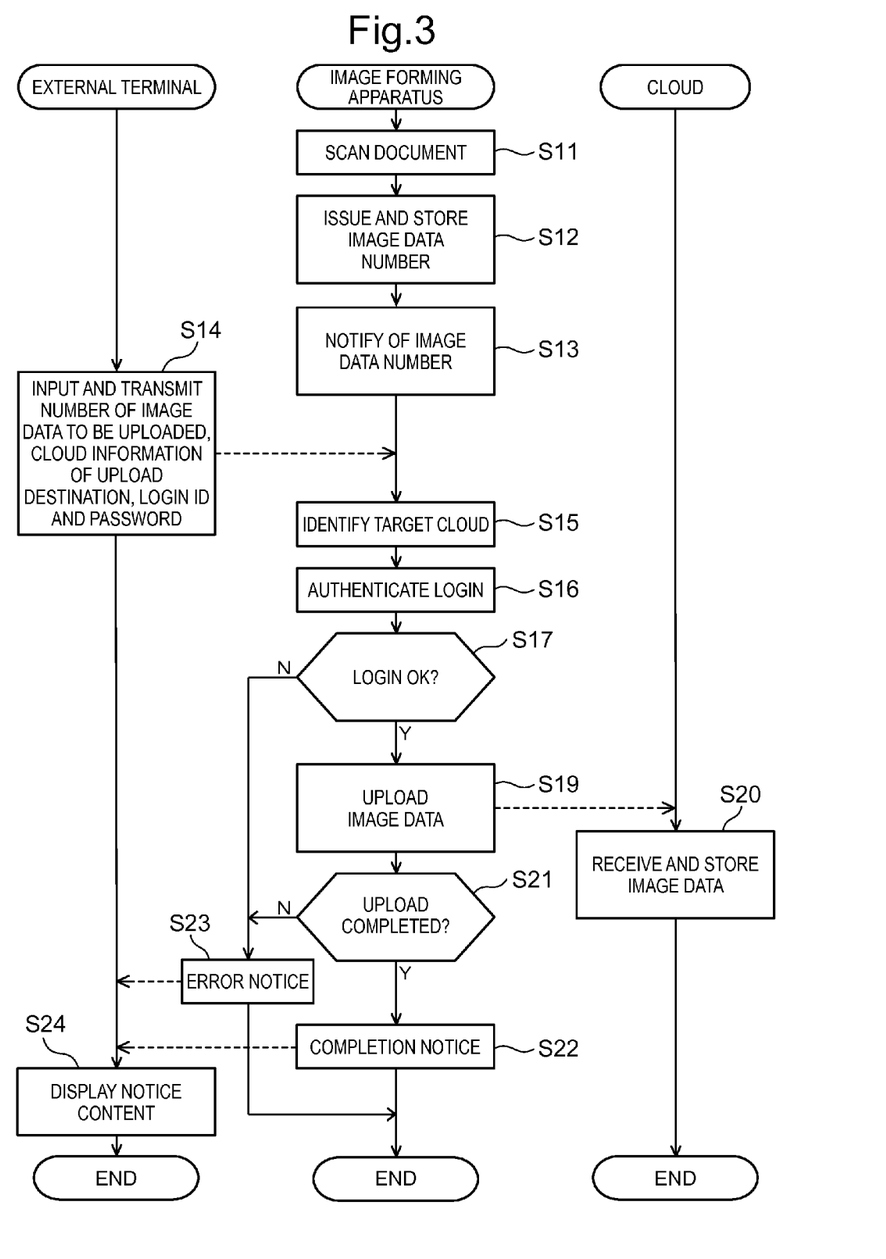
FIG. 3 is a flow chart showing a flow of an uploading process according to the first embodiment of the present disclosure.

FIG. 3 is a flow chart showing a flow of an unloading process in the present embodiment. First, a user sets a document for the image forming apparatus 2, and inputs a scanning instruction from the operating unit 23. Thereby, the image scanning unit 21 scans the document to acquire image data (S11). Then, the image data number issuing unit 241 issues a unique image data number for the acquired image data, and the control unit 24 maps the image data and the image data number and stores them in the image data storage unit 261 (S12).

Next, the control unit 24 notifies the user of the image data number (S13). This notification method includes, for instance, (1) the control unit 24 displaying the image data number on the display panel 231, (2) the control unit 24 transmitting an e-mail in which the image data number is recorded to the external terminal 3, and (3) the control unit 24 causing image forming unit 22 to print the image data number as the printing data.

In the case of the method (1), the user needs to transcribe the displayed image data number on paper. However, if the display of the display panel 231 is erased thereafter, the image data number is not known to another person. As such, it is possible to prevent the information leakage.

In the case of the method (2), the user inputs an e-mail address to the image forming apparatus 2, and the control unit 24 transmits the e-mail in which the image data number is recorded to the address. Thereby, it is possible to prevent the information leakage. Otherwise, when input of a user ID is required when the image forming apparatus 2 is used, the user ID and the e-mail address are mapped and stored in the storage unit 26. Thereby, the e-mail address of the user can be identified, and the control unit 24 can send the e-mail in which the image data number is recorded to the e-mail address.

In the case of the method (3), the user can transcribe the image data number onto the paper as in the method (1), or save effort such as the input of the user ID as in the method (2). However, the image data number is at risk of being known to the other person if the paper is forgotten.

Next, the user inputs the image data number, the cloud information, and the login information (the login ID and the password) constituting the upload information into the external terminal 3. The external terminal 3 transmits the input content to the image forming apparatus 2 (S14).

The control unit 24 retrieves the upload information from the external terminal 3 via the communication unit 27. First, the target cloud identification unit 252 identifies the target cloud from the cloud information included in the upload information (S15).

Subsequently, the login authentication unit 253 performs the authenticating process on the target cloud using the login ID and the password of the login information included in the upload information (S16). When the login is successful (YES of S17), the upload control unit 254 reads the image data of the transmitted image data number out of the image data storage unit 261, and uploads the read image data to the cloud 1 (S19). The cloud 1 receives the image data, and the server 12 stores the received image data (S20).

When the uploading is performed normally (YES of S21), the control unit 24 causes the communication unit 27 to transmit an upload completion notice to the external terminal 3 (S22), and terminates the process. When the login fails (NO of S17) or when the uploading fails to be performed normally (NO of S21), the control unit 24 causes the communication unit 27 to transmit an error notice to the external terminal 3 (S23), and terminates the process.

The external terminal 3 displays a message on a monitor according to the notice content transmitted from the image forming apparatus 2 (S24), and terminates the process.

As described above, the login ID and the password for the target cloud to which the image data is uploaded are input from the personal computer 3a or the mobile phone 3b which the user individually uses, and are transmitted to the image forming apparatus 2. Thereby, it is not necessary to directly input the login ID and the password into the image forming apparatus 2 used by an unspecified number of persons. As such, it is possible to prevent the information leakage and to enhance the security.

Further, a data capacity that can be accumulated in the server 12 is limited. Even when the image data is uploaded to the cloud 1, the image data may not be uploaded due to an excess of capacity. A residual capacity of the server cannot be typically checked from the image forming apparatus. Conventionally, after an upload operation from the image forming apparatus to the cloud is performed, the user looks at an upload error notice, and can know the excess of capacity for the first time. Afterwards, there is a need to search for an uploadable cloud, and much trouble is taken.

However, it is possible to know the residual capacity of the server 12 from the external terminal 3. In other words, the document is scanned by the image forming apparatus 2 first, and then the user can select and designate a cloud to upload while a residual capacity of the cloud is checked by the external terminal 3. For this reason, it is possible to save effort to re-designate the cloud to perform the upload operation again due to an upload error caused by the excess of capacity, and to increase convenience.

In other words, when the document to be uploaded is scanned in the image forming apparatus 2, the user need not designate the cloud used as the upload destination. After the document to be uploaded is scanned by the image forming apparatus 2, the user can select the cloud (server) used as the upload destination of the image data of the corresponding document from a plurality of clouds using the external terminal 3, and upload the image data of the corresponding document to the selected cloud.

Second Embodiment

In the first embodiment, it has been described that the storage unit 26 of the image forming apparatus 2 stores the cloud connector application 264. In the second embodiment, it will be described that a website (server SV managing the website) on the Internet N stores and executes a cloud connector application 264. The server SV will be described as an electronic device storing and executing the cloud connector application 264 as an example. However, without being limited thereto, any electronic device will suffice as long as it can perform communication with a cloud 1, an image forming apparatus 2, and an external terminal 3 via the Internet N.

Figure 4:
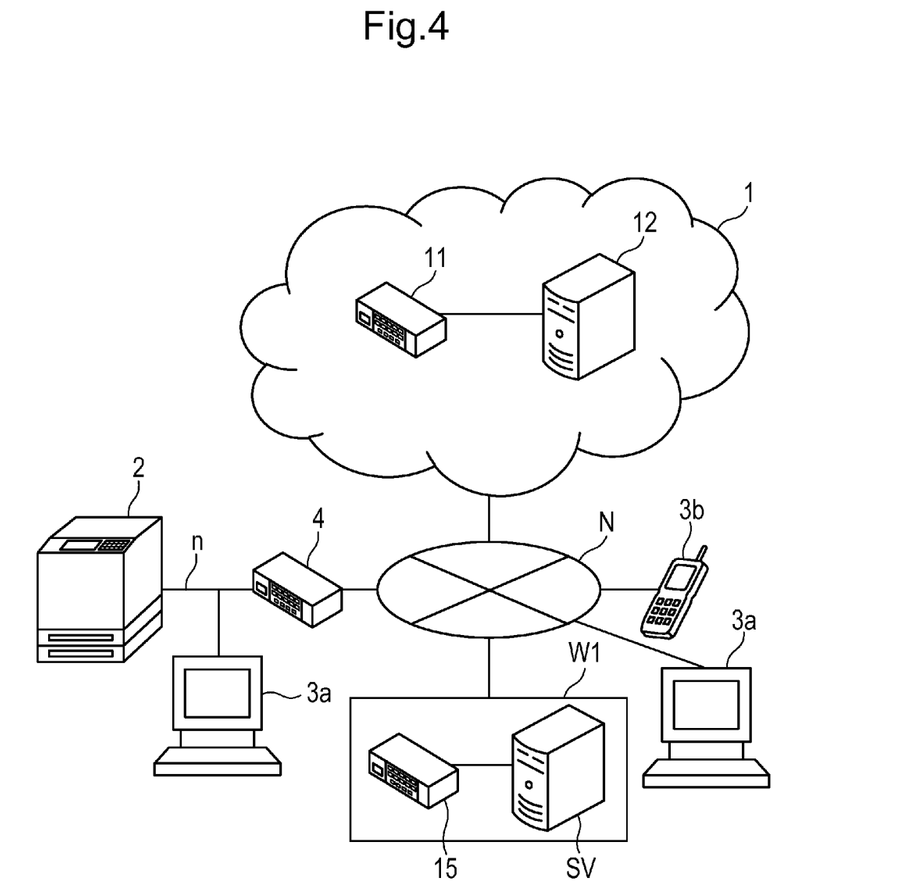
FIG. 4 is a diagram showing an uploading system according to a second embodiment of the present disclosure.

An uploading system in the second embodiment will be described. FIG. 4 is a diagram showing the uploading system in the second embodiment. A description of a constitution similar to that of the uploading system shown in FIG. 1 in the first embodiment will be omitted.

The uploading system in the second embodiment further includes a website W1 for data upload management, in addition to the constitution of the uploading system in the first embodiment. The website W1 has a router 15 and the server SV. The router 15 is an electronic device for interconnecting the server SV and the Internet N. The server SV performs storage of data required to realize the website W1 and processes required to realize the website W1. However, the uploading system according to the second embodiment includes a constitution made up of the image forming apparatus 2 and the website W1, without the portable terminal 3 and the cloud 1. This is similarly applied to a third embodiment to be described below.

Figure 5:
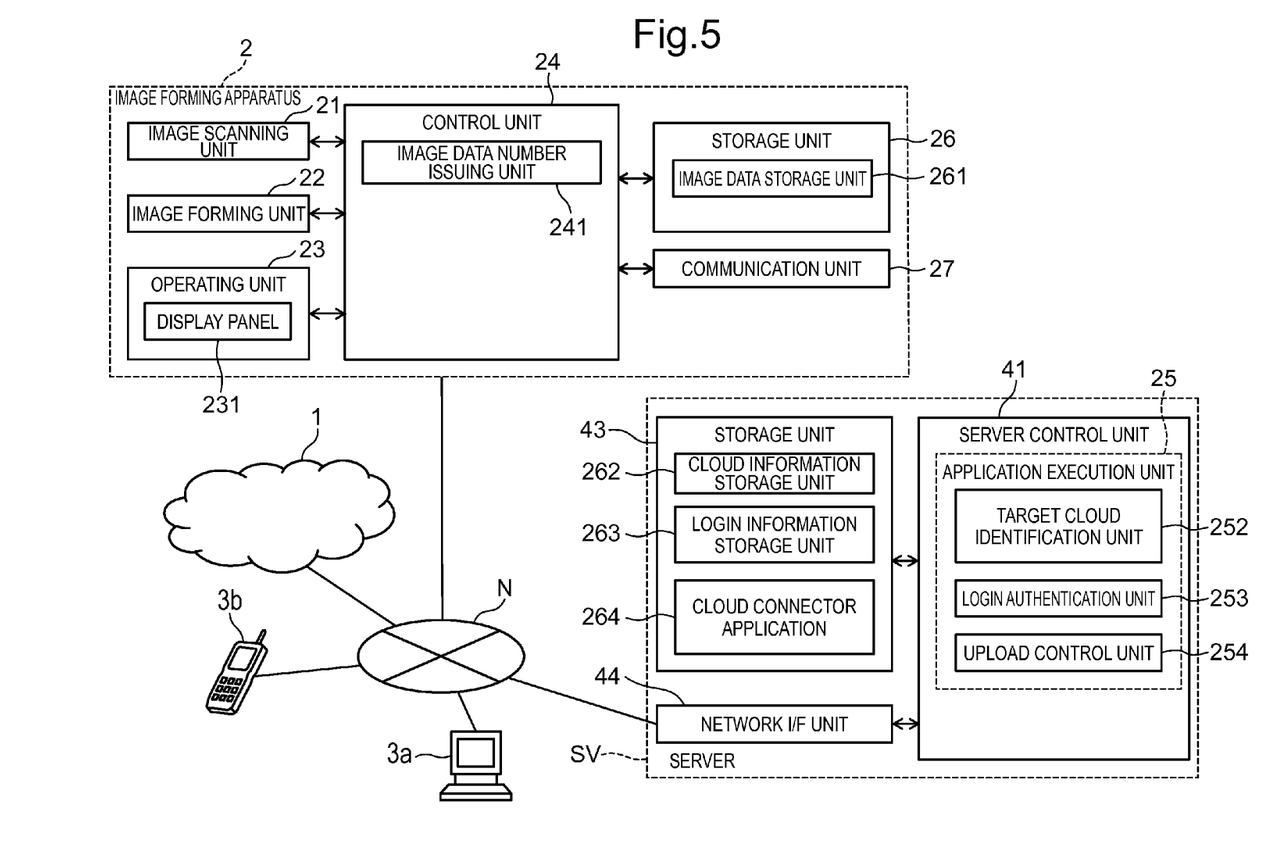
FIG. 5 is a block diagram showing electrical constitutions of an image forming apparatus and a router according to the second embodiment of the present disclosure.

FIG. 5 is a block diagram showing electrical constitutions of the image forming apparatus 2 and the server SV in the present embodiment. The server SV includes a server control unit 41, a storage unit 43, and a network interface (I/F) unit 44.

The storage unit 43 stores a cloud connector application 264. The storage unit 43 includes a cloud information storage unit 262, and a login information storage unit 263.

The network I/F unit 44 is a communication interface circuit for performing communication with the cloud 1 or the mobile phone 3b, and the image forming apparatus 2 or the personal computer 3a via the Internet N.

The server control unit 41 is made up of a CPU, reads and processes the program such as the cloud connector application 264 stored in the storage unit 43, and performs output of an instruction signal and transmission of data to each functional unit, thereby collectively controlling the server SV. The server control unit 41 has an application execution unit 25.

In the second embodiment, the image data number issuing unit 241 of the image forming apparatus 2 includes an apparatus-specific identification number for identifying the corresponding image forming apparatus 2 to an image data number to be issued, and issues the corresponding image data number.

Figure 6:
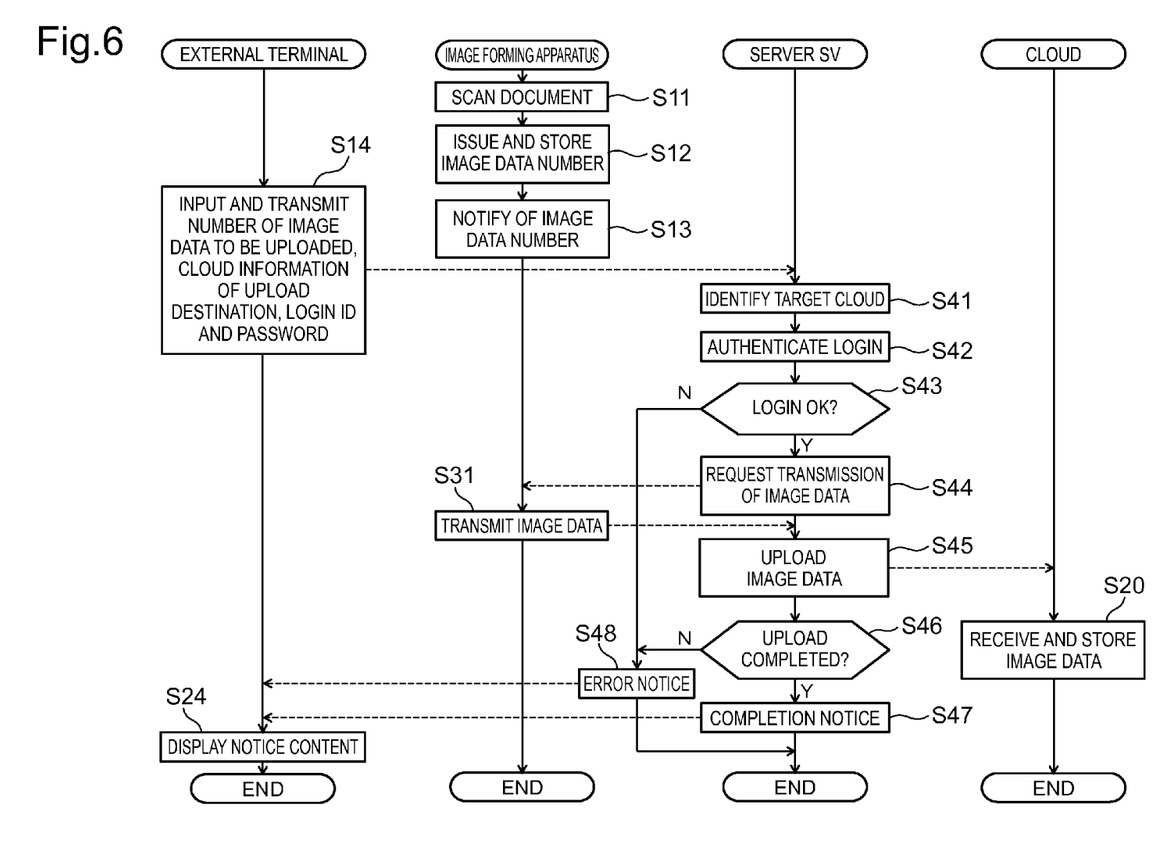
FIG. 6 is a flow chart showing a flow of an uploading process according to the second embodiment of the present disclosure.

FIG. 6 is a flow chart showing a flow of an uploading process in the present embodiment. First, a user sets a document for the image forming apparatus 2, and inputs a scanning instruction from the operating unit 23. Thereby, the image scanning unit 21 scans the document to obtain image data (S11). Then, the image data number issuing unit 241 issues a unique image data number with respect to the obtained image data, and the control unit 24 maps the image data and the image data number and stores them in the image data storage unit 261 (S12).

Next, the control unit 24 notifies the user of the image data number on the display panel 231 (S13). Then, the user inputs each piece of information constituting upload information into the external terminal 3. The external terminal 3 transmits the input content to the server SV of the website W1 via the Internet N (S14).

The server control unit 41 retrieves the upload information transmitted from the external terminal 3, and the target cloud identification unit 252 identifies a target cloud first (S41). Subsequently, the login authentication unit 253 performs an authenticating process on the target cloud using a transmitted login ID and password (S42). When login is successful (YES of S43), the upload control unit 254 transmits a transfer request of the image data which is indicated by the image data number to the image forming apparatus 2 (S44). When the control unit 24 of image forming apparatus 2 receives the transfer request, the control unit 24 reads the image data out of the image data information storage unit 261 of the storage unit 26 based on the image data number, and transmits it to the server SV (S31). When the network I/F unit 44 of the server SV receives the image data, the upload control unit 254 uploads the image data to the cloud 1 (S45). The cloud 1 receives the image data, and a server 12 of the cloud 1 stores the image data (S20).

When the uploading is performed normally (YES of S46), the server control unit 41 causes the network I/F unit 44 to transmit an upload completion notice to the external terminal 3 (S47), and terminates the process. When the login fails (NO of S43) or when the uploading fails to be performed normally (NO of S46), the server control unit 41 causes the network I/F unit 44 to transmit an error notice to the external terminal 3 (S48), and terminates the process.

The external terminal 3 displays a message on a monitor according to the notice content transmitted from the image forming apparatus 2 (S24), and terminates the process.

In the first embodiment, it has been described that the external terminal 3 transmits the upload information input by the user to the image forming apparatus 2. In this case, the login ID and the password for the cloud are accumulated and stored in a memory (not shown) of the image forming apparatus 2, and when the memory is incorrectly analyzed, the login ID and the password may leak out.

However, in the uploading system of the second embodiment, the server control unit 41 receives the login ID and the password to perform the authenticating process on the cloud 1. As such, the login ID and the password are not input in the image forming apparatus 2. Accordingly, it is possible to further increase the security.

Third Embodiment

An uploading system according to a third embodiment has a constitution similar to that of the uploading system according to the second embodiment, but is different in the following respects. In the first and second embodiments, it has been described that, as the cloud connector application 264 is executed, the upload control unit 254 uploads the image data to the cloud 1. In the third embodiment, the image forming apparatus 2 independently uploads image data to a cloud 1 apart from a process of the cloud connector application 264.

Figure 7:
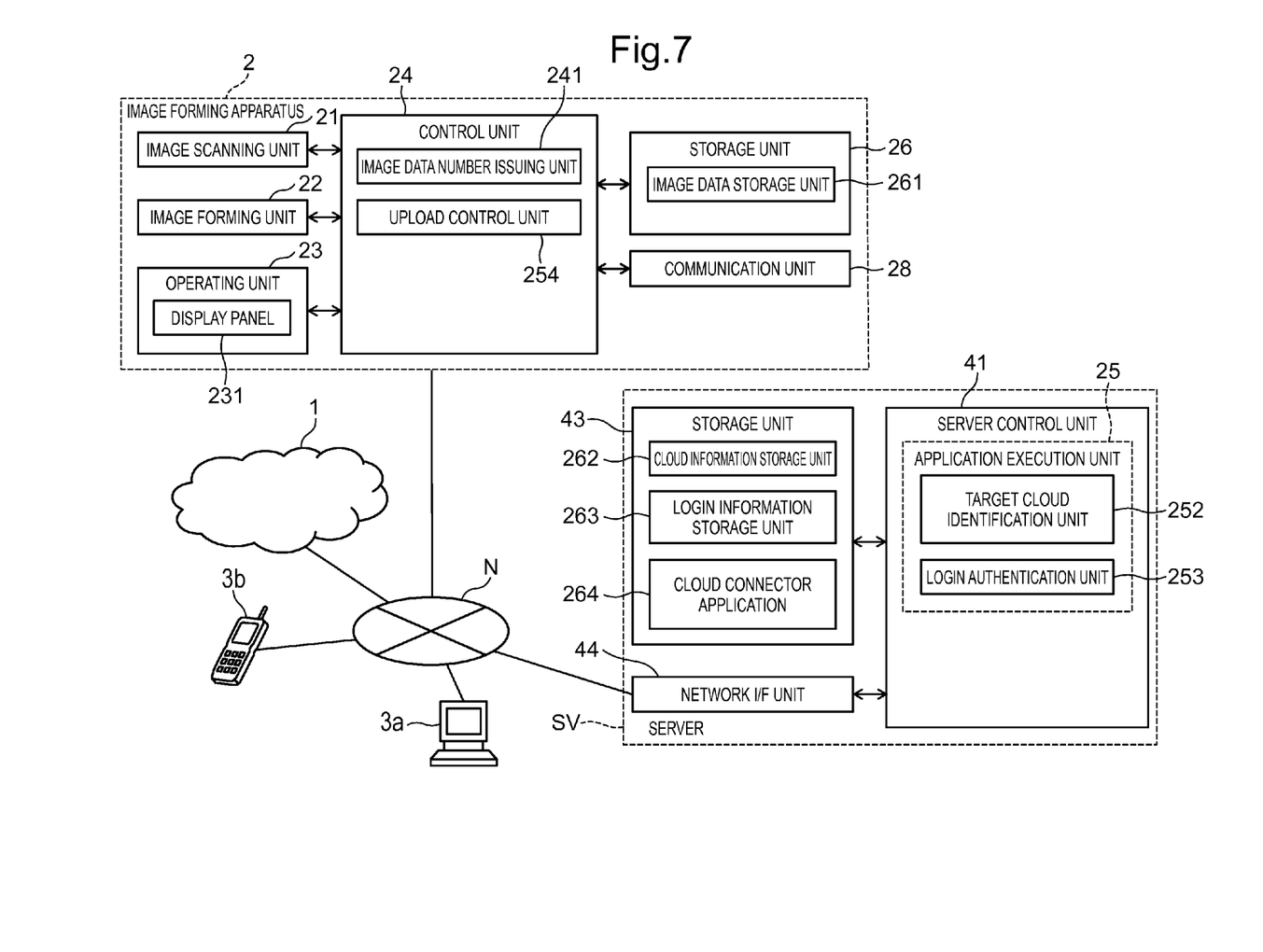
FIG. 7 is a block diagram showing electrical constitutions of an image forming apparatus and a router according to a third embodiment of the present disclosure.

FIG. 7 is a block diagram showing electrical constitutions of the image forming apparatus 2 and the server SV in the present embodiment. Only portions different from those of the first and second embodiments will be described. The control unit 24 of the image forming apparatus 2 includes an image data number issuing unit 241 and an upload control unit 254. The application execution unit 25 provided for the server control unit 41 has a target cloud identification unit 252 and a login authentication unit 253.

Figure 8:
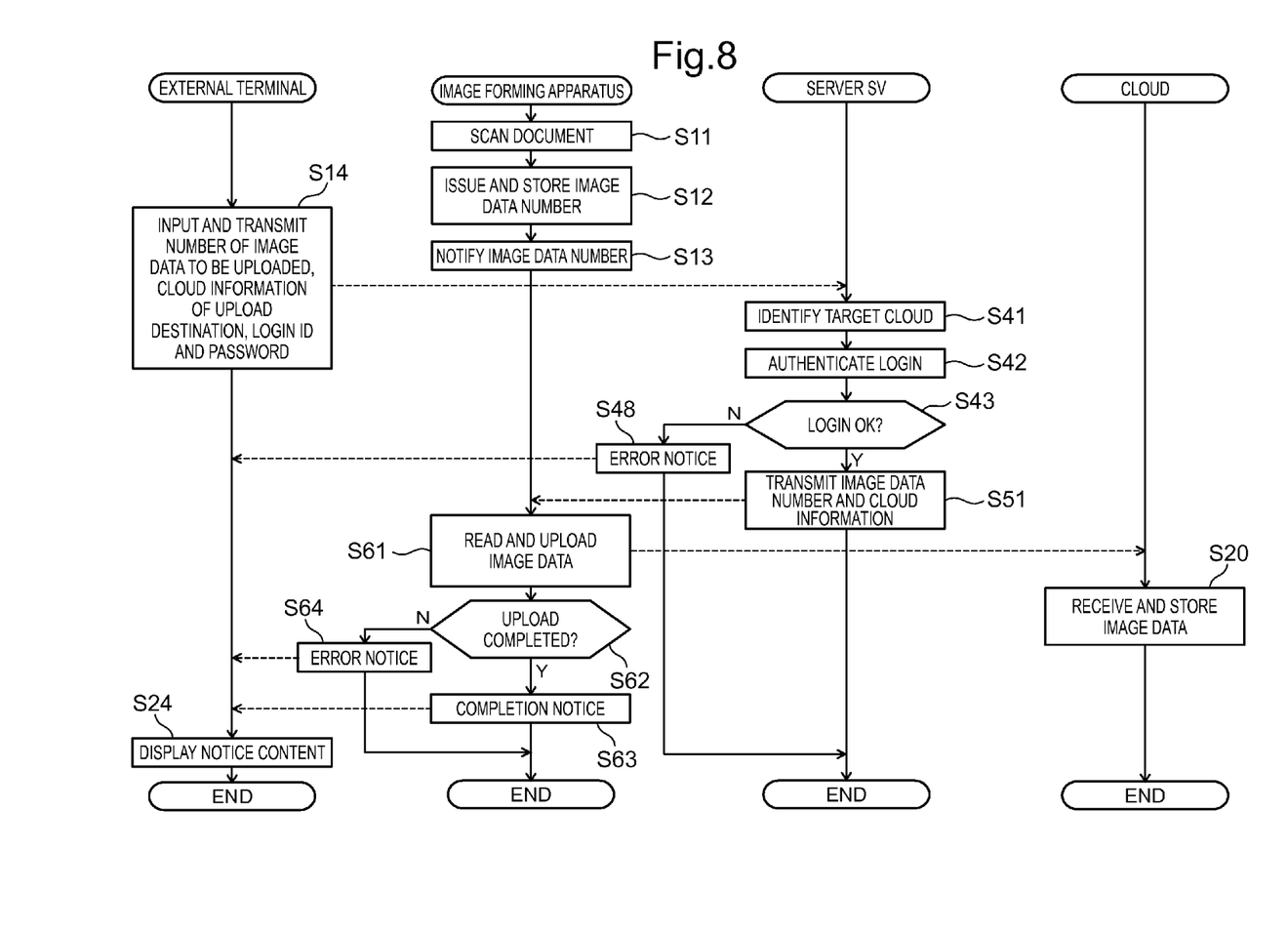
FIG. 8 is a flow chart showing a flow of an uploading process according to the third embodiment of the present disclosure.

FIG. 8 is a flow chart showing a flow of an uploading process in the present embodiment. First, a user sets a document for the image forming apparatus 2, and inputs a scanning instruction from the operating unit 23. Thereby, the image scanning unit 21 scans the document to obtain image data (S11). Then, the image data number issuing unit 241 issues a unique image data number with respect to the obtained image data, and the control unit 24 maps the image data and the image data number and stores them in the image data storage unit 261 (S12).

Next, the control unit 24 notifies the user of the image data number (S13). Then, the user inputs each piece of information constituting upload information into the external terminal 3. The external terminal 3 transmits the input content to the server SV (S14).

The server control unit 41 retrieves the upload information transmitted from the external terminal 3, and the target cloud identification unit 252 identifies a target cloud first (S41). Subsequently, the login authentication unit 253 performs authentication on the target cloud using a login ID and a password (S42). When login fails (NO of S43), the server control unit 41 causes the network I/F unit 44 to transmit an error notice to the external terminal 3 (S48), and terminates the process.

When the login is successful (YES of S43), the application execution unit 25 causes the communication unit 42 to transmit the image data number and the cloud information of the target cloud to the image forming apparatus 2 (S51).

When the control unit 24 of the image forming apparatus 2 receives the image data number and the cloud information, the upload control unit 254 reads the image data out of the image data information storage unit 261 based on the image data number, and uploads the image data to the cloud 1 based on the cloud information (S61). The cloud 1 receives the image data, and the server 12 stores the image data (S20).

When the uploading is performed normally (YES of S62), the control unit 24 causes the communication unit 27 to transmit an upload completion notice to the external terminal 3 (S63), and terminates the process. When the uploading is not preformed normally (NO of S62), the control unit 24 causes the communication unit 27 to transmit an error notice to the external terminal 3 (S64), and terminates the process.

The external terminal 3 displays a message on a monitor according to the notice content transmitted from the image forming apparatus 2 (S24), and terminates the process.

As described above, the upload control unit 254 of the image forming apparatus 2 directly uploads the image data to the cloud 1. Thereby, since the image data is not required to be read out by another electronic device, it is possible to prevent the leakage of the image data.

In general, when the access to the server possessed by the cloud is provided, it is necessary to input the login ID and the password for logging into the cloud. In this case, when the login ID and the password are input to the digital multifunction device used by an unspecified number of users when logging into the cloud, there is a possibility of the login ID and the password leaking out to another user, which is a problem in view of security.

However, in each embodiment according to the present disclosure, the user does not directly input the login information (the login ID and the password) required to log into the upload destination of the image data into the image forming apparatus, but, for instance, inputs the login information into the external terminal which the user individually uses, and the information receiving unit receives the login information from the external terminal. As such, the login information may not be input into the image forming apparatus used by an unspecified number of users. For this reason, it is possible to prevent the information from leaking out to another person by reading the login information while inputting the information into the image forming apparatus, and to increase the security.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. An image forming apparatus comprising:
    a communication unit performing communication with an external terminal used by a user via a network;
    a scanning unit scanning a document image to obtain image data;
    an issuing unit issuing an image data number identifying the image data;
    a storage unit mapping and storing the image data and the image data number;
    a control unit controlling to notify the image data number to the user;
    an information receiving unit receiving the image data number, and uploading destination identification information indicating an upload destination of the image data, and login information for logging into the upload destination from the external terminal via the communication unit at a timing after the storage stored the image data and the image data number;
    an identification unit identifying the upload destination based on the upload destination identification information when the information receiving unit received the image data number, the upload destination identification information, and the login information;
    an authentication unit performing an authenticating process required to perform an authentication of whether or not to give access to the upload destination indentified by the identification unit based on the login information received by the information receiving unit; and
    a communication control unit that reads out the image data corresponding to the image data number received by the information receiving unit from the image data stored by the storage unit when the access to the upload destination is permitted in the authenticating process by the authentication unit, and transmits the corresponding image data to the upload destination.

2. The image forming apparatus according to claim 1, where in the control unit causes the communication unit to transmit an error notice to the external terminal, when the authentication by the authentication unit fails or when the image data is not uploaded to the upload destination normally.

3. The image forming apparatus according to claim 1, further comprising
    a display unit, and
    a display control unit controlling display of the display unit as the control unit;
    wherein the display control unit displays the image data number issued by the issuing unit on the display panel.

4. The image forming apparatus according to claim 1, wherein the communication control unit as the control unit transmits the image data number issued by the issuing unit to the external terminal.

5. The image forming apparatus according to claim 1, further comprising a printing unit that performs printing on paper based on printing data, wherein the control unit cause the printing unit to perform the printing on the paper using the image data number issued by the issuing unit as the printing data.

6. A computer-readable non-transitory storage medium with a uploading program stored thereon, the uploading program causing a computer to function as:
    an information receiving unit that receives an image data number for identifying image data stored by an image forming apparatus, upload destination identification information indicating an upload destination of the image data presented by the image data number, and login information about the upload destination from an external terminal used by a user at a timing after the storage stored the image data and the image data number;
    an identification unit identifying the upload destination based on the upload destination identification information when the information receiving unit received the image data number, the upload destination identification information, and the login information;
    an authentication unit that performs an authenticating process required to authenticate whether or not to give access to the upload destination identified by the identification unit based on the login information received by the information receiving unit; and
    an uploading unit that, when the access to the upload destination is permitted in the authenticating process by the authentication unit, reads the image data corresponding to the image data number from the image data stored by the external image forming apparatus, and uploads the read image data to the upload destination.

7. An uploading system comprising an image forming apparatus and an upload control device that are communicable with an external terminal used by a user via a network, wherein
    the image forming apparatus includes:
        a scanning unit scanning a document image to obtain image data;
        an issuing unit issuing an image data number identifying the image data; and
        a storage unit mapping and storing the image data and the image data number;
    a control unit controlling to notify the image data number to the user; and
    the upload control device includes:
        an information receiving unit that inputs the image data number from an external terminal, upload destination identification information indicating an upload destination of the image data, and login information for logging into the upload destination at a timing after the storage stored the image data and the image data number;
        an identification unit identifying the upload destination based on the upload destination identification information when the information receiving unit received the image data number, the upload destination identification information, and the login information;

an authentication unit that performs an authenticating process required to authenticate whether or not to give access to the upload destination identified by the identification unit based on the login information received by the information receiving unit; and an uploading unit that, when the access to the upload destination is permitted in the authenticating process by the authentication unit, extracts the image data, which is indicated by the image data number received by the information receiving unit, from the storage unit of the image forming apparatus, and uploads the image data to the upload destination.

8. An uploading system comprising an image forming apparatus and an upload control device that are communicable with an external terminal used by a user via a network, wherein the image forming apparatus includes:
a scanning unit scanning a document image to obtain image data;
an issuing unit issuing an image data number identifying the image data; and
a storage unit mapping and storing the image data and the image data number;
a control unit controlling to notify the image data number to the user;

the upload control device includes:
an information receiving unit that receives the image data number from an external terminal, upload destination identification information indicating an upload destination of the image data presented by the image data number, and login information for logging into the upload destination at a timing after the storage stored the image data and the image data number;
an identification unit identifying the upload destination based on the upload destination identification information when the information receiving unit received the image data number the upload destination identification information, and the login information;
an authentication unit that performs an authenticating process required to authenticate whether or not to give access to the upload destination identified by the identification unit based on the login information received by the information receiving unit; and
a transmitting unit that, when the access to the upload destination is permitted in the authenticating process by the authentication unit, transmits the image data number received by the information receiving unit and the upload destination identification information to the image forming apparatus; and the image forming apparatus further includes:
a receiving unit that receives the image data number and the upload destination identification information from the transmitting unit of the upload control device; and
an uploading unit that reads the image data number received by the receiving unit from the storage unit of the image forming apparatus, and uploads the image data to the upload destination received by the receiving unit.

* * * * *